United States Patent Office 3,279,994
Patented Oct. 18, 1966

3,279,994
RIBOFLAVIN BEADLET COMPOSITION
Arnold Koff, West Orange, N.J., assignor to Hoffmann-La Roche Inc., Nutley, N.J., a corporation of New Jersey
No Drawing. Filed Feb. 19, 1963, Ser. No. 259,734
3 Claims. (Cl. 167—81)

This invention relates to a new article of manufacture and sale, and more particularly to a new article of manufacture in the pharmaceutical field. The novel product of the invention can be described as riboflavin in the form of free-flowing, pleasant-tasting, stable beadlets.

Riboflavin has been dispensed for many years in multivitamin dosage forms; more particularly, in liquid formulations and in gelatin capsules. More recently there has been a demand for multivitamin chewable tablets containing riboflavin-active materials. However, riboflavin has a relatively low solubility in aqueous media compared to the other vitamin B materials, and hence chewable tablets containing riboflavin often do not provide the riboflavin in a form which is biologically highly available to the animal body.

It has now been found that a riboflavin composition containing a riboflavin-active material and an edible starch uniformly distributed in a mixture of mono- and diglycerides of naturally occurring saturated fatty acids having from 16 to 18 carbon atoms, provides a very high biological availability of the riboflavin in the animal body.

The compositions of the invention contain from about 20 to about 45, preferably about 30 to about 40 percent of a riboflavin-active material, preferably riboflavin itself; from about 3 to about 20 percent, preferably about 10 percent, of an edible starch, e.g., wheat starch, potato starch, sago starch, rice starch, and, preferably, cornstarch; and from about 45 to about 77 percent, preferably about 50 to about 60 percent of a material comprising essentially a mixture of monoglycerides and diglycerides of naturally occurring saturated fatty acids having from 16 to 18 carbon atoms. The above percentages are percentages by weight, based on the weight of the final composition.

Mixtures of glyceryl monostearate and glyceryl distearate containing substantial amounts of glyceryl monopalmitate and glyceryl dipalmitate are available commercially, and such commercial mixtures can be employed for purposes of the invention. For example, "Atmos 150," a granular food emulsifier supplied by Atlas Powder Company, Wilmington, Delaware, is described as a mixture consisting essentially of mono- and diglycerides of stearic and palmitic acids. A generally similar material is "Hydrofol Glycerides T-57-L," supplied by Archer-Daniels-Midland Company, Cleveland, Ohio. Either of these, or equivalent commercial mixtures, can be employed as the coating material of the invention.

The compositions of the invention, in addition to having high biological availability of the riboflavin, have good taste characteristics, and hence are therefore useful for the manufacture of chewable multivitamin tablets, as well as for other pharmaceutical products and for the preparation of vitamin-enriched foods. Accordingly, the compositions of the invention are intended to be suitable (among other uses) as articles of commerce, for sale to pharmaceutical and food manufacturers.

The compositions of the invention are in the form of free-flowing, pleasant-tasting, powders which are useful for the above purposes.

The compositions of the invention are prepared by forming a melt containing the riboflavin-active material and the starch uniformly distributed in molten monoglycerides-diglycerides mixture; atomizing the resulting melt into discrete liquid droplets substantially all of which have a diameter of less than 150 microns, and the major portion of which have a diameter of from about 10 to about 100 microns, as determined by a Coulter counter; rapidly air-cooling said droplets into a congealed state; and screening the resulting beadlets.

It has also been discovered that the beadlet size of the compositions of the invention have an effect on the biological availability of the riboflavin in the animal body. In particular, beadlet sizes larger than about 150 microns generally exhibit decreased biological availability and hence the beadlet size of the compositions of the invention is an important feature of the invention i.e., substantially all of the beadlets must have a diameter less than 150 microns.

In carrying out the processes of the invention, a first step comprises forming a melt of the glycerides mixture to be employed as the coating material, and uniformly dispersing therein the riboflavin-active material and the starch. Conveniently, this step is effected in a melting tank wherein the glycerides mixture is raised to a temperature several degrees (e.g., 5°–15° C.) above its melting point, and then the finely divided riboflavin-active material and the starch are dispersed therein, with good agitation to produce homogeneous distribution, the temperature of the melting tank being kept sufficiently high to maintain the glycerides-starch-riboflavin mixture in a fluid state. The melt is then transferred to a conventional spray-chilling tower or chamber, wherein the molten material is atomized into droplets, which are then quickly chilled by blowing cool (about 20° C.) air through the tower. Any convenient atomizing device (such as a two-fluid nozzle or a high-speed centrifugal atomizing wheel) can be employed, under conditions that will give discrete droplets of the melt having a size in the above indicated ranges. The solidified or congealed droplets fall to the bottom of the tower, where they are collected and then screened in order to remove agglomerates or coarse material.

The invention is further discussed in the following example which is illustrative, but not limitative thereof.

*Example*

560 g. of "Atmos 150" are charged to a melting vessel and heated while stirring to a temperature of 65° C. 340 g. of finely divided riboflavin and 100 g. of cornstarch are then mixed into the tank while stirring, and the resulting suspension is stirred for 30 minutes to assure uniform dispersal, the temperature of the melt being meanwhile gradually raised to 77° C. The melt at the latter temperature is then transferred to a centrifugal atomizing wheel, rotated at 12,500 r.p.m., the molten material being fed at the rate of 25 gallons per hour. Air at a temperature of 20° C. is blown through the spray tower. The chilled droplets fall to the bottom of the tower. Any beadlets that are carried over in the effluent air stream are collected in a cyclone separator. All of the beadlets are collected and screened through a 20 mesh screen. The product is riboflavin in the form of free-flowing, pleasant-tasting beadlets having an average diameter of about 75 microns.

I claim:
1. As an article of manufacture, a riboflavin-active material in the form of pleasant-tasting beadlets having a diameter of less than about 150 microns; said beadlets being composed substantially entirely of from about 20 to about 45 percent riboflavin-active material, from about 3 to about 20 percent edible starch, and from about 45 to about 77 percent of a material comprising essentially a mixture of monoglycerides and diglycerides of naturally occurring saturated fatty acids having from 16 to 18 carbon atoms.

2. A composition according to claim 1 wherein the edible starch is cornstarch.

3. A composition according to claim 2 which contains from about 30 to about 40 percent riboflavin, about 10 percent cornstarch, and from about 50 to about 60 percent of said mixture of monoglycerides and diglycerides.

References Cited by the Examiner
UNITED STATES PATENTS

| | | | |
|---|---|---|---|
| 3,080,292 | 3/1963 | Koff | 167—82 |
| 3,089,824 | 5/1963 | Wurster | 167—82 |
| 3,091,567 | 5/1963 | Wurzburg et al. | 167—82 |
| 3,091,574 | 5/1963 | Coletta et al. | 167—82 |
| 3,163,579 | 12/1964 | Derivan | 167—82 |
| 3,175,948 | 3/1965 | Koff et al. | 167—81 |
| 3,184,385 | 5/1965 | Anderson | 167—81 |

OTHER REFERENCES

"Remington's Practice of Pharmacy," The Mack Publishing Co., Easton, Pa., 1956, p. 376.

JULIAN S. LEVITT, *Primary Examiner.*

GEORGE A. MENTIS, *Assistant Examiner.*